May 26, 1964 N. E. LENTZ 3,134,946
DYNAMIC PULSE COMPARATOR USING SWITCHED TRANSFORMER SECONDARIES
AND TRANSFORMER PRIMARY AS PLURAL INPUTS
Filed Dec. 29, 1961
FIG. 1
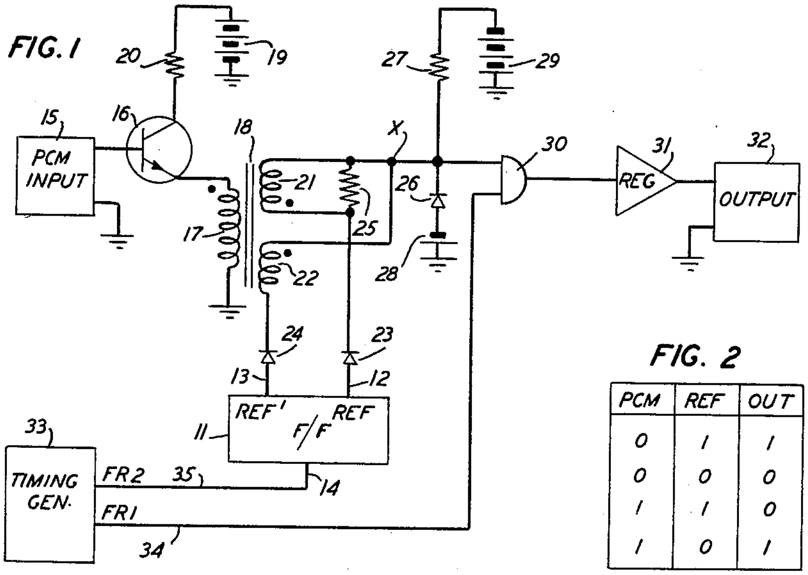
FIG. 2
| PCM | REF | OUT |
|---|---|---|
| 0 | 1 | 1 |
| 0 | 0 | 0 |
| 1 | 1 | 0 |
| 1 | 0 | 1 |
FIG. 3
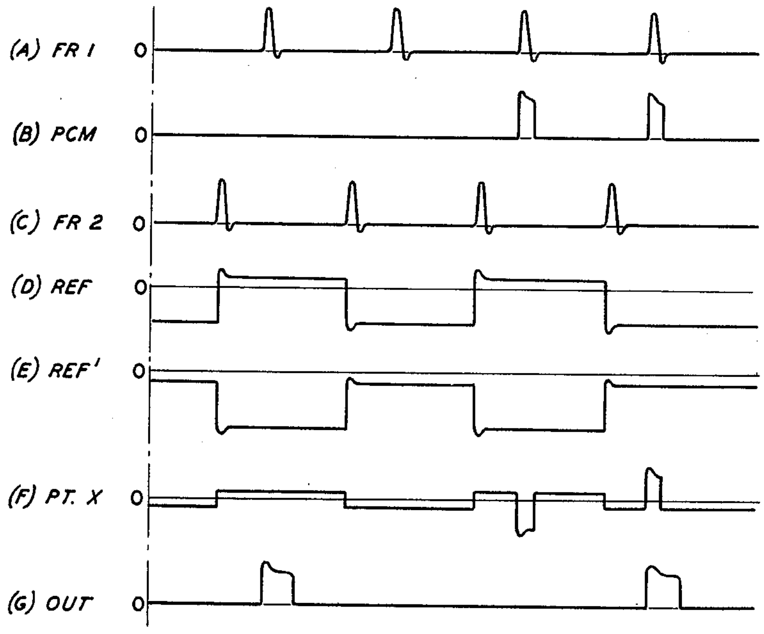
INVENTOR
N.E. LENTZ
BY R. B. Andis
ATTORNEY 3,134,946
DYNAMIC PULSE COMPARATOR USING SWITCHED TRANSFORMER SECONDARIES AND TRANSFORMER PRIMARY AS PLURAL INPUTS Norman E. Lentz, Haverhill, Mass., assignor to Bell Telephone Laboratories, Incorporated, New York, N.Y., a corporation of New York Filed Dec. 29, 1961, Ser. No. 163,310
4 Claims. (Cl. 328—93)

This invention relates generally to so-called logic circuits for pulse systems and more particularly to logic circuits of the comparator or disparity recognizer type.

A principal object of the invention is to simplify the circuitry required for pulse comparators or disparity recognizers to as great an extent as possible.

A closely related object of the invention is to reduce the number of components required for pulse comparators or disparity recognizers to as low a level as possible.

In the transmission and processing of intelligence in the form of binary or two-state electrical signals, it is occasionally necessary to compare the information which is present contemporaneously in different channels and derive one indication when the information is alike and another when it is different. Circuits for accomplishing this purpose are known as comparators or disparity recognizers. Many such circuits are known in the art and all have their own advantages and disadvantages. Most, however, are not particularly simple and most require an appreciable number of circuit components.

The present invention takes advantage of active components which may already be necessary in a pulse system for other purposes and employs them to reduce to a bare minimum the additional circuitry required to perform the comparison or disparity recognition function. In a system which already includes a flip-flop circuit having outputs which are opposite to one another in phase, the invention permits ready comparison of the state of one of the flip-flop outputs with the state of a separate input pulse channel. In accordance with the invention, the input pulses are applied to the primary winding of a transformer having a pair of oppositely phased secondary windings and each flip-flop output is used to switch one of the secondary windings to a common output lead. The switching controlled by the flip-flop output combines with the relative phasing of the transformer secondary winding to provide one indication on the common output lead when the compared signals are alike and another when they are different.

A more complete understanding of the invention may be obtained from a study of the following detailed description of one specific embodiment. In the drawing:

FIG. 1 illustrates an embodiment of the invention employed to detect lack of synchronism in a pulse code modulation transmission system;

FIG. 2 is a truth table illustrating the operation of the embodiment of the invention shown in FIG. 1; and FIG. 3 is a succession of waveforms further illustrating the operation of the embodiment of the invention shown in FIG. 1.

In any time division multiplex message transmission system, it is essential that the receiving circuitry be kept in synchronism with the transmitting circuitry at all times. In a multichannel pulse code modulation (henceforth called simply PCM) system, the transmitted waveform is made up of successive "frames" which are in turn made up of successive code groups of pulses and spaces. Because the apparatus at opposite terminals must be kept in rigid synchronism with respect to frames as well as with respect to code groups and digit spaces within the code groups, the synchronizing process is generally known simply as framing. A preferred framing method has, in the past, consisted in adding an additional digit space once each frame and transmitting a recognizable pulse pattern, such as an alternate on-off sequence, in these spaces during successive frames. Apparatus at the receiving terminal operates to hold synchronism as long as this pattern is received during the proper digit spaces and to scan and restore synchronism whenever it is not. United States Patent 2,984,706, which issued May 16, 1961, to H. M. Jamison and R. L. Wilson, gives an example of apparatus providing such a framing pattern, while United States Patent 2,949,503, which issued August 16, 1960, to F. T. Andrews, Jr., and H. Mann, gives an example of framing circuitry sensitive to such a pattern.

The comparator or disparity recognizer illustrated in FIG. 1 is employed to detect an out-of-frame condition in a PCM receiver making use of such apparatus. Since the framing pattern transmitted is an alternate on-off sequence in the framing digit spaces, a conventional flip-flop or binary counter circuit 11 is present in the receiver to generate an on-off pattern at the framing rate for reference purposes. Flip-flop 11 has a pair of output leads 12 and 13, labeled REF and REF′, respectively. These output leads are opposite in phase to one another at all times. Although other voltage levels may be employed to advantage as well, in the example shown, REF lead 12 alternates between voltages of approximately −8 and +2, while REF′ lead 13 alternates between voltages of approximately −2 and −12. Flip-flop 11 also has a third or input lead 14.

The invention makes double use, in a sense, of flip-flop 11, in minimizing the circuit elements needed for comparing the state of REF lead 12 with that of the framing digit space in the incoming PCM pulse train. The PCM input in FIG. 1 is illustrated as a box 15 which represents the preceding PCM transmitting and receiving apparatus. As has already been indicated, the received PCM pulse train has a digit space added to each frame for framing purposes and has an alternate on-off pulse pattern in that digit space. In the illustrated embodiment of the invention, the PCM train is applied to the base electrode of an n-p-n transistor 16. Transistor 16, which provides current gain has its emitter returned to ground through the primary winding 17 of a transformer 18 and its collector returned to a positive potential source 19 through a current-limiting resistor 20.

Transformer 18 in the embodiment of the invention illustrated in FIG. 1 has a pair of secondary windings 21 and 22 which are, as indicated by the dots, oppositely phased with respect to another. Winding 21 has its lower terminal in phase with the upper terminal or primary winding 17, while winding 22 has its upper terminal in phase with the upper terminal of primary winding 17. In accordance with the invention, at the same time that the incoming PCM train is applied through transistor 16 to primary winding 17, REF lead 12 of flip-flop 11 is connected through a diode 23 to the lower terminal of winding 21 and REF′ lead 13 is connected through a diode 24 to the lower terminal of winding 22. The upper terminals of windings 21 and 22 are connected together at point X to form a single output lead. Diodes 23 and 24 are poled, as illustrated, for easy current flow from flip-flop 11 toward their respective transformer secondary windings. A damping resistor 25, shown by way of example across winding 21, is connected across any of the several windings of transformer 18 to avoid excessive ringout.

The combined output lead from secondary windings 21 and 22 is clamped to a —2 volt reference level by a diode 26 and a biasing resistor 27. Diode 26 is poled toward the common output lead and is connected to a negative voltage source 28 of about two volts. Resistor 27, on the other hand, is returned to a source 29 of a larger negative voltage. In order to provide shaping of the comparator output, the combined lead is connected to one input lead of an AND gate 30. AND gate 30 is, in turn, connected through a pulse regenerator 31, which may be simply a triggered blocking oscillator, to output circuit 32. Pulses at the framing rate are supplied by a timing generator 33 on an FR1 lead 34 to the other input lead of AND gate 30 and on an FR2 lead 35 to the driving lead 14 of flip-flop 11. The pulses on FR2 lead 35 are delayed the order of half the framing period from those on FR1 lead 34.

FIG. 2 is a so-called truth table showing the logic of the comparator formed by transformer 18, diodes 23 and 24, and flip-flop 11. In the PCM column, 1 represents the presence of a pulse (a positive voltage of approximately eight volts), while 0 represents the absence of a pulse (approximately zero voltage). In the REF column, 1 represents a positive voltage on REF lead 12, while 0 represents a negative voltage. Finally, in the OUT column, 1 represents a positive voltage at point X, while 0 represents a negative voltage. As illustrated, the logic is that of a comparator or disparity recognizer. The output is a 1 for unlike inputs and a 0 for like outputs. The invention permits this result to be achieved simply and reliably and with a minimum of additional circuitry over that already required in the system for other purposes.

FIG. 3 illustrates a number of waveforms showing details of the operation of the comparator in FIG. 1. In each waveform, the time scale is considerably compressed between framing pulses in order to illustrate essential operation without adding obscuring and essentially irrelevant detail.

Line A in FIG. 3 illustrates the framing pulses appearing on FR1 lead 34 of timing generator 33, while line B illustrates PCM pulses appearing at the base electrode of transistor 16. Line B shows only pulses appearing during framing intervals for clarity, but it should be understood that many PCM signaling and message pulses can and generally do intervene. Line C of FIG. 3 illustrates the delayed framing pulses appearing on the FR2 lead 35 of timing generator 33. While the first pulse appearing in line C occurs before the first pulse in line A, it is obvious that it is in fact a delayed version of the next preceding pulse on the FR1 lead. Lines D and E of FIG. 3 show the waveforms appearing on the REF and REF′ leads 12 and 13 of flip-flop 11, while line F illustrates that appearing at point X as a result of the illustrated PCM input. Line G shows the final output waveform supplied to output circuit 32 by pulse regenerator 31.

FIG. 3 is patterned after the truth table in FIG. 2 in that all four of the possible input conditions are illustrated. During the four successive framing periods shown, the input at REF lead 12 of flip-flop 11 is 1, 0, 1, 0, while that on the PCM input lead to transistor 16 is 0, 0, 1, 1. The final output from regenerator 31 is 1, 0, 0, 1. For the alternate on-off framing pattern, such an output is obviously indicative of an out-of-frame condition.

When REF lead 12 in FIG. 1 is positive, indicating a 1 input, diode 23 is forward biased and a positive potential of about two volts is placed on the lower terminal of transformer winding 21. At the same time, the potential on REF′ lead 13 is about 12 volts negative, back biasing diode 24 and effectively removing winding 22 from the circuit. When there is no pulse present at the base of transistor 16, there is no counterbalancing impulse passed through transformer 18 to winding 21 and the positive 2 volt potential appears at point X. When a framing pulse appears at AND gate 30 coincidentally with this potential, regenerator 31 is triggered and an output pulse is passed to output circuit 32. When there is a positive pulse present at the base of transistor 16, however, the positive potential on winding 21 is effectively canceled and point X is driven negatively. Under these conditions, no pulse is passed to trigger regenerator 31 when the framing pulse is applied to AND gate 30.

Generally opposite conditions exist when a 0 appears on REF lead 12. Lead 12 is then about 10 volts negative and diode 23 is reverse biased, removing winding 21 from the circuit. The potential on REF′ lead 13 is only about 2 volts negative, forward biasing diode 24. When no positive PCM pulse is received on the base electrode of transistor 16, this negative potential appears at point X and AND gate 30 does not trigger regenerator 31 when the next framing pulse appears. When a PCM pulse is received, however, point X is driven about 6 volts positive and, when the framing pulse appears, regenerator 31 is triggered and passes an output pulse to output circuit 32.

It is to be understood that the above-described arragement is illustrative of the principles of the invention. Numerous other arrangements may be devised by those skilled in the art without departing from the spirit and scope of the invention.

What is claimed is:

1. In a system which includes an input channel adapted to carry a train of binary pulses and a flip-flop circuit having a pair of outputs which are opposite in phase to one another, means for comparing the state of one of said flip-flop outputs with the state of said input channel which comprises a transformer having a primary winding and a pair of secondary windings, means connecting said primary winding across said input channel, an output lead connected to one end of each of said secondary windings, the phase of each of said secondary windings being opposite to that of the other on the end connected to said output lead, and a switch connected between each of said flip-flop circuit outputs and the other end of a corresponding one of said secondary windings.

2. A pulse comparator for deriving one output when the contents of a pair of input channels are alike and another when they are different which comprises a transformer having a primary winding and a pair of secondary windings, means to supply the contents of one of said channels to said primary winding, an output lead connected to one end of each of said secondary windings, the phase of each of said secondary windings being opposite to that of the other on the end connected to said output lead, a pair of switches connected to the other ends of respective ones of said secondary windings, means to apply the contents of the other of said channels to drive a first of said switches, and means to drive the other of said switches oppositely in phase to said first switch.

3. An arrangement for detecting lack of synchronism between the binary state of an incoming pulse train and the binary state of a locally generated pulse train which comprises a transformer having a primary winding and a pair of secondary windings, means to supply said incoming pulse train to said primary winding, an output lead connected to one end of each of said secondary windings, the phase of each of said secondary windings being opposite to that of the other on the end connected to said output lead, a pair of switches connected to the other ends of respective ones of said secondary windings, and means to drive said switches oppositely with respect to one another under the control of said locally generated pulse train.

4. An arrangement in accordance with claim 3 which includes pulse regenerating means connected to said output lead to generate an output pulse whenever the potential on said output lead has one binary state and no output pulse whenever the potential on said output lead has the opposite binary state.

References Cited in the file of this patent

UNITED STATES PATENTS

| | | |
|---|---|---|
| 2,755,459 | Carbrey | July 17, 1956 |
| 2,921,190 | Fowler | Jan. 12, 1960 |
| 2,977,485 | Olsen | Mar. 28, 1961 |